Nov. 20, 1928. Re. 17,144
W. M. SCHWARTZ
PANEL
Fig. 1. Original Filed May 8, 1926
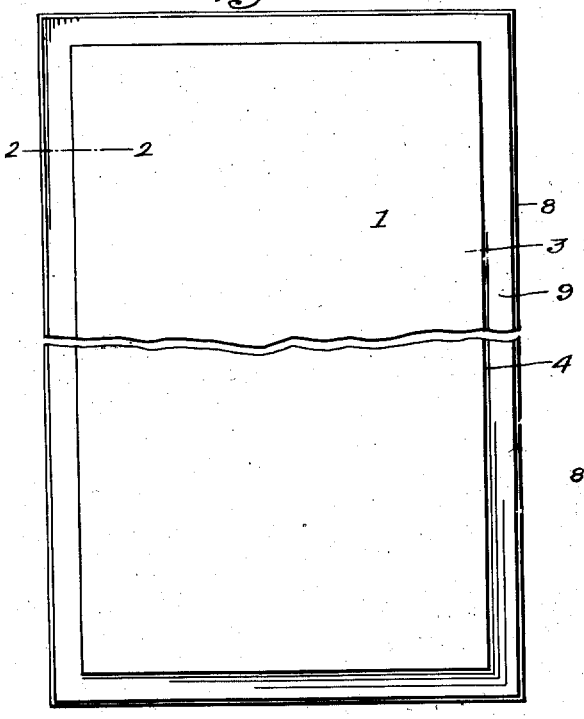
Fig. 2.
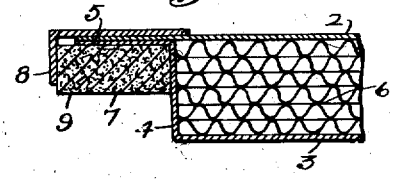
Fig. 3.
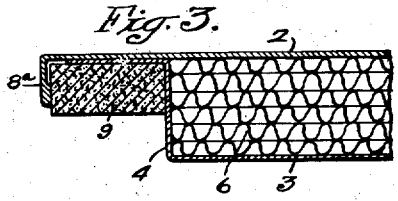
Fig. 5.
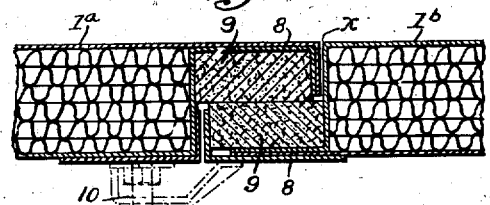
Fig. 4.
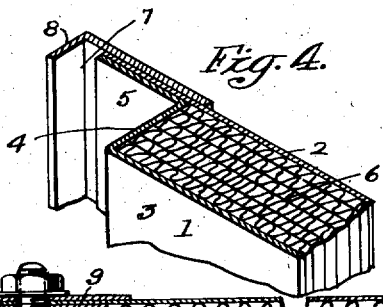
Fig. 6.
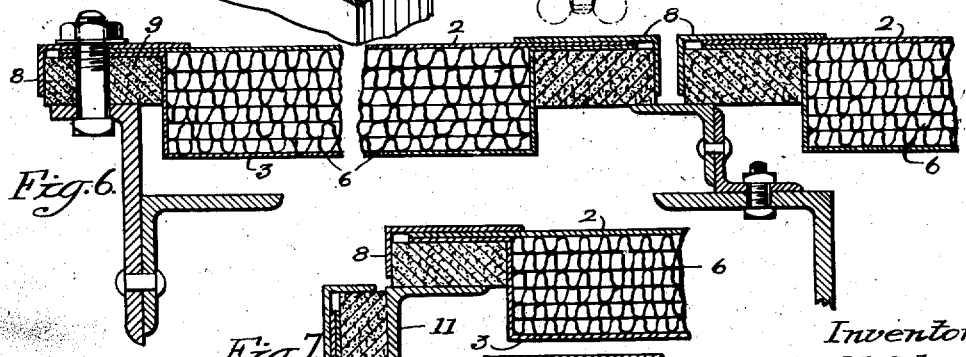
Fig. 7.
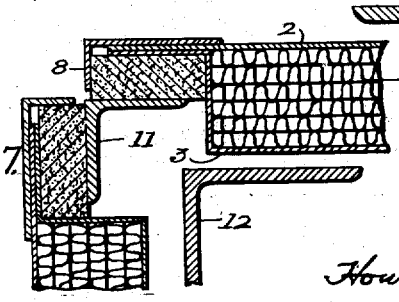
Inventor,
Walter M. Schwartz,
by his Attorneys,
Howson & Howson Reissued Nov. 20, 1928. Re. 17,144

UNITED STATES PATENT OFFICE.

WALTER M. SCHWARTZ, OF PHILADELPHIA, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

PANEL.

Original No. 1,652,055, dated December 6, 1927, Serial No. 107,675, filed May 8, 1926. Application for reissue filed October 5, 1928. Serial No. 310,637.

My invention relates to certain improvements in metal panels, preferably of the type having non-conducting material between the inner and outer walls. Panels of this type are used in drying apparatus for preventing heat from radiating through the walls of the apparatus.

One object of this invention is to provide a panel with a recess at the edge for the reception of a non-conducting strip of material, preferably cork.

Another object of the invention is to so construct the panels that when the panels are assembled, the cork insert of one panel will be in contact with the insert of an adjoining panel.

In the accompanying drawings:

Fig. 1 is a face view of my improved panel;

Fig. 2 is an enlarged sectional view on the line 2—2, Fig. 1;

Fig. 3 is a sectional view of a panel in which the flange is formed by bending one of the plates of the panel;

Fig. 4 is a sectional perspective view of the panel shown in Fig. 2;

Fig. 5 is a sectional perspective view showing two panels arranged side by side and the flanges overlapping;

Fig. 6 is a view showing another method of assembling the panels; and

Fig. 7 is a view showing the arrangement of the panel in forming a corner.

The panel 1 is made of any size and shape desired, and consists of two sheet-metal plates 2 and 3. The plate 2 is a flat sheet, while the plate 3 is bent at right angles to form a wall 4 and is bent at 5 parallel with the plate 2, the portions 5 being spot-welded to the plate 2. The depth of the angular wall 4 determines the thickness of the panel. The space between the two plates 2 and 3 is filled with any suitable heat non-conducting material 6, such for instance as asbestos.

A channel 7 is formed at the edges of the panel either by welding or otherwise securing a light angle strip 8 to the plate 2, as in Fig. 2, or bending the edges of the plate 2 to form a flange $8^a$, Fig. 3.

The first-mentioned construction is preferably used on a removable panel, and the other construction is used on a fixed panel as in Fig. 5, but either form may be adopted as desired.

In the channel formed by the flanges is located a strip of non-conducting material 9, such as cork. The cork is cut to size and is forced into the recess, the surface of the cork extending above the flange so that there will be no metallic contact of one panel with another or with a structural support.

The panels are so arranged that there is a clear space "$x$" between the edges of the panels as in Fig. 5.

By the above construction a comparatively small amount of heat is conducted from the inner plate of a drier to the outer plate.

In Fig. 5 is a view showing two panels arranged side by side, one panel $1^a$ being a fixed panel of a drying machine, while the other panel $1^b$ is a removable panel detachably secured to the fixed panel by any suitable clamp 10.

Fig. 6 illustrates one arrangement by which the panels are secured to the structural angle bars of a drier, and Fig. 7 is a view showing how the corners are formed. The cork inserts rest upon the surface of a small angle iron 11 which is located a short distance beyond the main corner angle iron 12. Clamping bolts are used such as shown in Fig. 6.

I claim:

1. The combination in a panel of two plates spaced apart forming the front and the back of the panel; a wall extending from the front to the rear plate around the edges of the panel; an extension on one of said plates beyond said edge wall; a flange on said extension projecting toward the other of said plates, whereby a channel is formed around the panel outside said edge wall; and an insert of non-conducting material located in said channel having a bearing surface extending outwardly from and at an angle with respect to said edge wall.

2. The combination in a panel of two plates spaced apart forming the front and the back of the panel; a wall extending from the front to the rear plate around the edges of the panel; an extension on one of said plates beyond said edge wall; a flange on said extension projecting toward the other of said plates, whereby a channel is formed around the panel outside said edge wall; and an insert of non-conducting material located in said channel having a bearing surface extending outwardly from said edge wall and substantially parallel to said front and back plates.

3. The combination in a panel, of two plates spaced apart forming the front and the back of the panel, one of said plates being bent at an angle at the edge and secured to the other plate; a channel beyond the edge of the bent panel; and an insert of non-conducting material located in the channel, the bearing face of the insert-material being parallel with the surface of the panel.

4. The combination in a panel, of two plates spaced apart; non-conducting material in the space between the plates, one of said plates being bent at an angle at its four edges, the end of said bent panel extending parallel with the other plate and secured thereto; a wide channel formed on all sides of said panel; and an insert of cork or other non-conducting material in the flange beyond the edge of the bent panel, the bearing surface of the insert being parallel with the body of the panel.

WALTER M. SCHWARTZ.